United States Patent [19]
Hendriks et al.

[11] Patent Number: 5,888,289
[45] Date of Patent: *Mar. 30, 1999

[54] BITUMEN COMPOSITIONS AND A PROCESS FOR THEIR PREPARATION

[75] Inventors: Henricus Engelbertus Johannes Hendriks; Koen Steernberg; Teunis Terlouw; Willem Cornelius Vonk, all of Amsterdam, Netherlands

[73] Assignee: Shell Oil Company, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 856,229

[22] Filed: May 14, 1997

[30] Foreign Application Priority Data

May 20, 1996 [EP] European Pat. Off. ............... 96303569

[51] Int. Cl.⁶ .......................... C09D 195/00; C08L 95/00
[52] U.S. Cl. ............................................ 106/273.1; 524/68
[58] Field of Search ............................. 106/273.1; 524/68

[56] References Cited

U.S. PATENT DOCUMENTS

| | | |
|---|---|---|
| 3,856,732 | 12/1974 | Bresson et al. . |
| 3,896,069 | 7/1975 | Kosaka et al. . |
| 3,978,014 | 8/1976 | van Beem et al. . |
| 4,728,683 | 3/1988 | Smits et al. ............................... 524/68 |
| 5,093,394 | 3/1992 | Rees et al. ................................ 524/68 |
| 5,369,156 | 11/1994 | Lesage ....................................... 524/68 |

FOREIGN PATENT DOCUMENTS

| | | |
|---|---|---|
| 0340210 | 4/1989 | European Pat. Off. . |
| 0337282 | 10/1989 | European Pat. Off. . |
| 0337282B1 | 10/1989 | European Pat. Off. ......... C08L 95/00 |
| 0340210B1 | 11/1989 | European Pat. Off. ......... C08L 95/00 |
| 0340210 | 11/1993 | European Pat. Off. ......... C08L 95/00 |
| 2533935 | 9/1982 | France . |
| 2533935 A | 4/1984 | France . |
| 35-820184 | 11/1983 | Japan ............................... C08L 95/00 |
| 358201847A | 11/1983 | Japan ............................... C08L 95/00 |
| 4-0727844 | 10/1995 | Japan ............................... C08L 95/00 |
| 407278440A | 10/1995 | Japan ............................... C08L 95/00 |

OTHER PUBLICATIONS

International Search Report dated Sept. 30, 1997 PCT/EP97/02707.

*Primary Examiner*—David Brunsman
*Attorney, Agent, or Firm*—Donald F. Haas

[57] ABSTRACT

The present invention provides a bitumen composition comprising a bitumen component, a thermoplastic rubber in an amount of less than 8 % wt, and an ethylene-vinyl acetate copolymer in an amount of less than 5 % wt, both based on total bitumen composition, wherein the ethylene-vinyl acetate copolymer has a vinyl content in the range of from 20 to 35% wt, based on copolymer; a process for preparing such bitumen composition; and the use of such bitumen compositions in asphalt mixtures for road applications.

11 Claims, No Drawings

BITUMEN COMPOSITIONS AND A PROCESS FOR THEIR PREPARATION

FIELD OF THE INVENTION

The present invention relates to bitumen compositions, a process for their preparation, and the use of them in asphalt mixtures for road applications.

BACKGROUND OF THE INVENTION

Bitumen is used as a binder in road asphalt mixtures and has been developed continually to meet ever-increasing performance demands from road building constructors. In general, bitumen performs well in road asphalt but increasingly heavy traffic loads have led to the premature wear of many roads through rutting and cracking of the surface. Cracking is a serious defect in a road asphalt because it allows water to reach lower layers of the road surface where it causes rapid deterioration and accelerates the need for repairs. Increasing the bitumen content of asphalt or using a softer grade of bitumen improves the crack resistance of asphalt at low temperatures but increases the risk of excessive rutting at higher temperatures because the mixture is effectively softer. Conversely, resistance to rutting can be improved by reducing the amount of bitumen in the asphalt mixture or by using a harder grade of bitumen at the expense of crack resistance because the mixture becomes less flexible.

Much effort is therefore nowadays directed to the development of a hard bitumen composition meeting today's crack resistance requirement, i.e. a bitumen composition having both a good low temperature performance and a good high temperature rutting resistance.

Another requirement which bitumen compositions frequently have to meet nowadays is the resistance to solvency of petroleum products such as fuels (e.g. gasoline and kerosene) and oils such as lubricating oils. This resistance to solvency is of importance in areas where asphalt mixtures are regularly exposed to spillage of fuels and oils. Such areas include for instance airfields, waste disposal areas, gas stations, and tank storage areas. When an asphalt mixture is exposed to fuel or oil spillage, the bitumen will be leached out of the asphalt mixture, eventually resulting in the loss of coarse aggregate from the road surface, so-called fretting of the road surface.

In view of the above it will be clear that it would be advantageous to develop a hard bitumen composition meeting today's crack resistance requirement and which would in addition display an improved resistance to solvency of petroleum products.

SUMMARY OF THE INVENTION

Surprisingly, it has now been found that such bitumen composition can be prepared by adding to a bitumen component a thermoplastic rubber and in addition, a particular ethylene-vinyl acetate copolymer.

Accordingly, the present invention provides a bitumen composition comprising a bitumen component, a thermoplastic rubber in an amount of less than 8 percent by weight (% wt), and an ethylene-vinyl acetate copolymer in an amount of less than 5 percent by weight (% wt), both based on total bitumen composition, wherein the ethylene-vinyl acetate copolymer has a vinyl acetate content in the range of from 20 to 35 percent by weight (% wt), based on copolymer. Although the use of an ethylene-vinyl acetate copolymer in a thermoplastic rubber-containing bitumen composition is as such known in general terms (see for instance EP-B1-0337282 and EP-B1-0340210) it should be noted that the advanced use of an ethylene-vinyl acetate copolymer having the particular vinyl acetate content as now claimed has not been disclosed before.

Preferably, the ethylene-vinyl acetate copolymer used in accordance with the present invention has a vinyl acetate content in the range of from 25 to 35% wt, more preferably in the range of from 30 to 35% wt, based on copolymer. Preferably, the ethylene-vinyl acetate copolymer to be used in accordance with the invention is present in an amount of less than 3% wt, based on total bitumen composition. More preferably, the ethylene-vinyl acetate copolymer is present in an amount in the range of 0.5 to 3% wt, based on total bitumen composition. Preferably, the thermoplastic rubber is present in an amount of less than 6% wt, based on total bitumen composition.

DETAILED DESCRIPTION OF THE INVENTION

The bitumen composition comprises a thermoplastic rubber. Suitably, the bitumen composition may comprise one or more different types of thermoplastic rubbers. Although a wide range of thermoplastic rubbers can suitably be used in accordance with the present invention, the preferred thermoplastic rubbers comprise optionally hydrogenated block copolymers which comprise at least two terminal poly(monovinylaromatic hydrocarbon) blocks and at least one central poly(conjugated diene) block, forming a continuous network.

Preferably, the block copolymer constituents are selected from the group consisting of those of the formulae $A(BA)_m$ or $(AB)_nX$, wherein A represents a block copolymer of predominantly poly(monovinylaromatic hydrocarbon), wherein B represents a block of predominantly poly(conjugated diene), wherein X represents the residue of a multivalent coupling agent and wherein n represents an integer $\geq 1$, preferably $\geq 2$, and m represents an integer $\geq 1$, preferably m is 1.

More preferably, the blocks A represent predominantly poly(styrene) blocks and the B blocks represent predominantly poly(butadiene) blocks or predominantly poly(isoprene) blocks. Multivalent coupling agents to be used include those commonly known in the art.

With the term "predominantly" is meant that the respective blocks A and B are mainly derived from monovinyl aromatic hydrocarbon monomers and conjugated diene monomers, which monomers may be mixed with other structurally related or non-related co-monomers, e.g. monovinyl aromatic hydrocarbon monomers as main component and small amounts (up to 10%) of other monomers or butadiene mixed with isoprene or small amounts of styrene.

More preferably, the block copolymers contains pure poly(styrene), pure poly(isoprene), or pure poly(butadiene) blocks, of which the poly(isoprene) or poly(butadiene) blocks may be selectively hydrogenated to at most a residual ethylenic unsaturation of 20%, more preferably less than 5% of its original unsaturation content prior to hydrogenation. Preferably, however, the block copolymers are not selectively hydrogenated. Most preferably, the applied block copolymer has the structure ABA, wherein A has an apparent molecular weight of from 3000 to 100,000, preferably from 5000 to 25,000 and the diblocks AB have an apparent molecular weight in the range of from 50,000 to 170,000. Preferably, the diblocks AB have an apparent molecular weight in the range of from 70,000 to 120,000.

With the term "apparent molecular weight" as used throughout the specification is meant the molecular weight of a polymer, as measured with gel permeation chromatography (GPC) using poly(styrene) calibration standards (according to ASTM 3536).

The originally prepared poly(conjugated diene) blocks usually contain from 5 to 65% by weight vinyl groups, originating from 1,2 polymerization relative to the conjugated diene molecules, and preferably a vinyl content from 10 to 55% by weight.

The complete block copolymer to be used according to the present invention normally contains polymerized vinyl aromatic monomers in an amount of from 10 to 60% by weight and preferably from 15 to 45% by weight. The apparent molecular weight of the total block copolymer will normally be in the range of from 100,000 to 500,000 and preferably in the range of from 150,000 to 200,000.

As examples of suitable pure block copolymers can be mentioned KRATON® G-1651, KRATON® G-1654, KRATON® G-1657, KRATON® G-1650, KRATON® G-1701, KRATON® D-1101, KRATON® D-1102, KRATON® D-1107, KRATON® D-1111, KRATON® D-1116, KRATON® D-1117, KRATON® D-1118, KRATON® D-1122, KRATON® D-1135X, KRATON® D-1184, KRATON® D-1144X, KRATON® D-1300X, KRATON® D-4141, and KRATON® D-4158 block copolymers.

The bitumen to be used may be a residue from distillation of crude oil, a cracked residue, an extract of a crude oil, a bitumen derived from propane bitumen, butane bitumen, pentane bitumen, or mixtures thereof. Other suitable bitumens include mixtures of the above bitumens with extenders (fluxes) such as petroleum extracts, e.g., aromatic extracts, distillates, or residues. Suitably, use is made of a bitumen component which has not be subjected to an oxidation treatment. Suitably, the bitumen has a penetration in the range of from 50 to 400 dmm, preferably 60 to 200 dmm (as measured by ASTM D 5 at 25° C.), and a softening point in the range of from 30° to 60° C., preferably in the range of from 35° to 50° C. (as measured by ASTM D 36).

Fillers such as carbon black, silica and calcium carbonate, stabilizers, antioxidants, pigments, and solvents are known to be useful in bitumen compositions and can be incorporated in the bitumen compositions of this invention in concentrations taught in the art.

The present invention further relates to a process for preparing any of the present bituminous compositions comprising mixing a bitumen at elevated temperature with less than 8% wt of a thermoplastic rubber and less than 5% wt of an ethylene-vinyl acetate copolymer, both based on total bitumen composition. Suitably, the present process is carried out at a temperature in the range of from 160° to 220° C. Preferably, the process according to the present invention is carried out at a temperature in the range of from 170° to 190° C. The process may be carried out at ambient pressure or elevated pressure. Normally, however, it will be carried out at ambient pressure. Suitably, the present process is carried out over a period of time of less than 6 hours, preferably less than 2 hours.

The present invention still further provides the use of a bitumen composition as described hereinbefore in an asphalt mixture for road applications.

The present invention will now be illustrated by means of the following examples.

Example 1

A bitumen composition in accordance with the present invention was prepared as follows.

A bitumen having a penetration of 88 dmm (as measured by ASTM D 5 at 25° C.) and a softening point of 47.5° C. (as measured by ASTM D 36) was mixed at a temperature of 180° C. and for 1 hour with 4% by weight of a linear non-hydrogenated polystyrene-polybutadiene-polystyrene block copolymer and 2% by weight of an ethylene-vinyl acetate copolymer, both based on total bitumen composition. The ethylene-vinyl acetate copolymer had a vinyl acetate content of 33% by weight, based on copolymer. The block copolymer had a 31% w styrene content, an apparent molecular weight of 170,000 and contained polystyrene-polybutadiene diblocks having an apparent molecular weight of 90,000. An asphalt mixture was then prepared by mixing the bitumen composition so obtained with aggregate. Subsequently, an asphalt specimen was prepared in accordance with the Marshall method RAW 57. The asphalt specimen was then stored under Jetfuel A1 for 24 hours. Then the solution was decanted and the mass of the asphalt specimen was determined after drying for 24 hours at ambient temperature. A kerosene resistance, which is expressed as a percentage of the mass of the original asphalt specimen, was observed of 0.8%.

Example 2

A bitumen composition in accordance with the present invention was prepared in a similar manner as described in Example 1, except that 5% by weight of the block copolymer, based on total bitumen composition, was used. Subsequently an asphalt specimen was prepared from the bitumen composition so obtained in a similar manner as described in Example 1. The asphalt specimen displayed a kerosene resistance of 0.6%.

Example 3

For reasons of comparison a bitumen composition was prepared in a similar manner as described in Example 1 except that no block copolymer and 5.5% by weight of an ethylene-vinyl acetate copolymer was used, based on total bitumen composition, having a vinyl acetate content of 18% by weight, based on copolymer. Subsequently an asphalt specimen was prepared from the bitumen composition so obtained in a similar manner as described in Example 1. The asphalt specimen displayed a kerosene resistance of 2.3%.

Example 4

For reason of comparison a bituminous composition was prepared in a similar manner as described in Example 1, except that an ethylene-vinyl acetate copolymer was used having a vinyl acetate content of 18% by weight, based on copolymer. Subsequently an asphalt specimen was prepared from the bitumen composition so obtained in a similar manner as described in Example 1. The asphalt specimen displayed a kerosene resistance of 3.1%.

Example 5

For reason of comparison a bituminous composition was prepared in a similar manner as described in Example 2, except that an ethylene-vinyl acetate copolymer was used having a vinyl acetate content of 40% by weight, based on copolymer. Subsequently an asphalt specimen was prepared from the bitumen composition so obtained in a similar manner as described in Example 1. The asphalt specimen displayed a kerosene resistance of 3.0%.

It will be clear from the above that the present invention provides hard bitumen compositions having an improved kerosene resistance (Examples 1 and 2) when compared with bitumen compositions falling just outside the scope of the present invention (Examples 3–5).

We claim:

1. Bitumen composition comprising a bitumen component, a thermoplastic rubber and an ethylene-vinyl acetate copolymer in amounts effective to improve resistance to solvency of petroleum products to 8 wt.% thermoplastic rubber and 5 wt.% ethylene-vinyl acetate copolymer, both based on total bitumen composition, wherein the ethylene-vinyl acetate copolymer has a vinyl acetate content in the range of from 20 to 35 wt.%, based on copolymer.

2. Composition according to claim 1, wherein the vinyl acetate content is in the range of from 25 to 35% wt, based on copolymer.

3. Composition according to claim 2, wherein the vinyl acetate content is in the range of from 30 to 35% wt, based on copolymer.

4. Composition according to claim 1, wherein the ethylene-vinyl acetate copolymer is present in an amount of less than 3% wt, based on total bitumen composition.

5. Composition according to claim 1, wherein the thermoplastic rubber is present in an amount of less than 6% wt, based on total bitumen composition.

6. Composition according to claim 1, wherein the bitumen has a penetration in the range of from 50 to 400 dmm (as measured by ASTM D 5 at 25° C.) and a softening point in the range of from 30° to 60° C. (as measured by ASTM D 36).

7. Composition according to claim 1, wherein the thermoplastic rubber comprises an optionally hydrogenated block copolymer which comprises at least two terminal poly(monovinylaromatic hydrocarbon) blocks and at least one central poly(conjugated diene) block.

8. Composition according to claim 7, wherein the block copolymer has the formulae $A(BA)_m$ or $(AB)_nX$ wherein A represents a block of predominantly poly(monovinyl aromatic hydrocarbon) and wherein B represents a block of predominantly poly(conjugated diene), wherein X represents the residue of a multivalent coupling agent and wherein n is an integer of at least 1 and m is an integer of at least 1.

9. Composition according to claim 8, wherein the A blocks are predominantly poly(styrene) blocks and the B blocks are predominantly poly(butadiene) blocks or predominantly poly(isoprene) blocks.

10. Composition according to claim 8, wherein diblocks prepared from A and B have an apparent molecular weight in the range of from 50,000 to 170,000.

11. Process for preparing a bituminous composition as defined in claim 1 comprising mixing a bitumen at elevated temperature with a thermoplastic rubber and an ethylene-vinyl acetate copolymer in amounts effective to improve resistance to solvency of petroleum products to 8 wt.% thermoplastic rubber and 5 wt.% ethylene-vinyl acetate copolymer, both based on total bitumen composition, wherein the ethylene-vinyl acetate copolymer has a vinyl acetate content in the range of from 20 to 35 wt.%, based on copolymer.

* * * * *